United States Patent
Singh et al.

(10) Patent No.: US 10,664,532 B2
(45) Date of Patent: May 26, 2020

(54) SELECTING TIME-SPECIFIC CONTENT FOR PRESENTATION TO A USER OF A SOCIAL NETWORKING SYSTEM

(71) Applicant: Facebook, Inc., Menlo Park, CA (US)

(72) Inventors: Aman Preet Singh, Sammamish, WA (US); Aliasgar Mumtaz Husain, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 395 days.

(21) Appl. No.: 15/436,747

(22) Filed: Feb. 17, 2017

(65) Prior Publication Data
US 2018/0239823 A1    Aug. 23, 2018

(51) Int. Cl.
*G06F 15/16* (2006.01)
*G06F 16/951* (2019.01)
*G06Q 50/00* (2012.01)
*G06F 16/9535* (2019.01)

(52) U.S. Cl.
CPC ........ *G06F 16/951* (2019.01); *G06F 16/9535* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 9,727,644 B1* | 8/2017 | Teng | G06F 16/215 |
| 2008/0255935 A1* | 10/2008 | Madhavan | G06Q 30/02 |
| | | | 705/14.64 |
| 2012/0066231 A1* | 3/2012 | Petersen | G06Q 30/02 |
| | | | 707/748 |
| 2014/0365507 A1* | 12/2014 | Wissner | G06F 16/972 |
| | | | 707/748 |
| 2016/0191447 A1* | 6/2016 | Firat | H04L 51/32 |
| | | | 709/204 |
| 2016/0292163 A1* | 10/2016 | He | G06F 16/9535 |

* cited by examiner

*Primary Examiner* — Alex Gofman
(74) *Attorney, Agent, or Firm* — Fenwick & West LLP

(57) ABSTRACT

A social networking system maintains content items associated with various topics. Each topic may be associated with a start time and/or an end time defining a time range during which content items associated with the topic are most likely to be relevant to social networking system users. The start time and/or end time associated with a topic may be based on information received from a user of the social networking system or on the occurrence of an event. The social networking system computes a score indicating a predicted affinity of a viewing user of the social networking system for each content item eligible for presentation to the viewing user and adjusts the affinity score based on a start time and/or an end time of an associated topic. One or more content items are selected for presentation to the viewing user based on the affinity score associated with each content item.

23 Claims, 4 Drawing Sheets

SELECTING TIME-SPECIFIC CONTENT FOR PRESENTATION TO A USER OF A SOCIAL NETWORKING SYSTEM

BACKGROUND

This disclosure relates generally to social networking systems, and more specifically to selecting time-specific content for presentation to users of a social networking system.

A social networking system allows its users to connect and communicate with other social networking system users. Users create profiles in the social networking system that are tied to their identities and include information about the users, such as interests and demographic information. The users may be individuals or entities such as corporations or charities. Because of the popularity of social networking systems and the significant amount of user-specific information maintained by social networking systems, a social networking system provides an ideal forum for allowing users to share content by creating content items for presentation to additional social networking system users. For example, users may share photos or videos they have uploaded by creating content items that include the photos or videos that are presented to additional users to whom they are connected in the social networking system. A social networking system also provides advertisers with abundant opportunities to increase awareness about their products or services by presenting advertisements to social networking system users. For example, advertisements presented to users allow an advertiser to gain public attention for products or services and to persuade social networking system users to take an action regarding the advertiser's products, services, opinions, or causes.

Conventionally, social networking systems generate revenue by displaying content to their users. For example, a social networking system may charge advertisers for each presentation of an advertisement to a social networking system user (i.e., each "impression"), or for each interaction with an advertisement by a social networking system user (e.g., each click on the advertisement, each purchase made as a result of clicking through the advertisement, etc.). Furthermore, by presenting content that encourages user engagement with social networking systems, social networking systems may increase the number of opportunities they have to generate revenue. For example, if a social networking system user scrolls through a newsfeed to view content that captures the user's interest, advertisements that are interspersed in the newsfeed also may be presented to the user.

Social networking systems traditionally select content items for presentation to social networking system users based on targeting criteria associated with the content items that specify one or more attributes of social networking system users eligible to be presented with the content items. For example, targeting criteria are used to identify users associated with specific user profile information satisfying at least one of the targeting criteria. Attributes specified by targeting criteria are usually associated with social networking system users who are likely to have an interest in content items associated with the targeting criteria or who are likely to find such content items relevant. For example, content items associated with a particular restaurant may be associated with targeting criteria describing social networking system users who have expressed an interest in the restaurant (e.g., users who frequently check in to the restaurant, users who have expressed a preference for a page associated with the restaurant maintained by a social networking system, etc.). Therefore, targeting criteria allow social networking systems to present content items to users who are likely to have affinities for such content items, which encourages user engagement with the social networking systems, thus increasing the number of opportunities the social networking systems have to generate revenue.

However, targeting criteria do not help social networking systems identify content items that may be more relevant to social networking system users during certain times than others. Content items maintained by social networking systems are often associated with topics that are seasonal in nature and are therefore likely to be of greater interest to social networking system users during particular time periods than others. For example, social networking system users are more likely to be interested in an event (e.g., the Super Bowl) while the event is occurring, as well as during the time just before and after the event occurs than during other times of the year. By failing to account for time as a factor when selecting content items for presentation to social networking system users, social networking systems may be presenting content items to users who no longer find the content relevant. In the above example, if targeting criteria associated with a content item associated with the Super Bowl identify users who have indicated an interest in football and either of the teams playing in the Super Bowl, social networking system users who have indicated an interest in football and in the losing team who would rather not be reminded of the Super Bowl may be presented with the content item several days or even weeks after the Super Bowl. Hence, by relying primarily on targeting criteria to select content for presentation to users, social networking systems may inadvertently present content that users no longer find interesting or relevant, which may be have a detrimental effect on user retention rates and long-term revenue.

SUMMARY

A social networking system generates a feed of content items (e.g., a newsfeed) specifically for each viewing user of the social networking system (e.g., based on the viewing user's interests and connections to additional users of the social networking system) and presents the feed of content items to the viewing user. For example, based on stored profile information describing hobbies/interests of a viewing user and connections established between the viewing user and additional users in the social networking system, the social networking system selects content items that are most likely to be relevant to the viewing user (e.g., content items associated with the viewing user's hobbies/interests and/or content items associated with the additional users). In this example, the social networking system generates a newsfeed that includes the selected content items and presents the newsfeed to the viewing user.

Content items generated by the social networking system may be associated with various topics of interest ("topics"). Topics may include subject matter associated with content items such as holidays, events, sports, movies, celebrities, hobbies, etc. Some topics associated with content items may be more likely to be relevant to social networking system users during certain times than other times. For example, content items associated with the topics of professional football and Christmas shopping are more likely to be relevant to social networking system users during football season and between Thanksgiving and Christmas day, respectively. Topics may be associated with start times and/or end times that define time ranges during which content items associated with the topics are most likely to be relevant to viewing users of the social networking system. For example, a start time for the topic of the 2020 Olympics may be the time of the opening ceremony while an end time for the topic may be the time of the closing ceremony. As an additional example, a topic related to a specific book may be associated with only a start time (e.g., the release date of the book) while a topic related to a building may be associated with only an end time (e.g., the date the building is to be demolished). In some embodiments, a topic may be associated with multiple start times and/or end times. For example, a topic related to a movie may be associated with a first start time (e.g., the day the movie is released in theaters) and a first end time (e.g., the day the movie is no longer playing in theaters) and a second start time (e.g., the day the movie is available for pre-order on DVD and Blu-ray) and a second end time (e.g., one month after the day the movie is released on DVD and Blu-ray).

To select content items for presentation to a viewing user, the social networking system identifies candidate content items eligible for presentation to the viewing user (e.g., based on targeting criteria associated with each content item identifying characteristics associated with the viewing user) and computes an affinity score associated with each candidate content item that indicates a predicted affinity of the viewing user for the candidate content item. The affinity score may be computed based on information associated with the viewing user maintained by the social networking system that tends to indicate an affinity of the viewing user for a candidate content item. For example, the social networking system computes an affinity score associated with a candidate content item that includes a video about makeup application based on profile information associated with a viewing user and historical actions performed by the viewing user with objects maintained by the social networking system that indicate an affinity of the viewing user for the candidate content item. In this example, the social networking system may compute a high affinity score if such information indicates that the viewing user has a high affinity for the candidate content item (e.g., demographic information describing the viewing user as being a female who is at least 16 years old, who has an occupation as a cosmetologist, and who has recently expressed a preference for and/or shared content items including videos about makeup application). Alternatively, in the above example, the social networking system may compute a low affinity score if such information indicates that the viewing user has a low affinity for the candidate content item (e.g., demographic information describing the viewing user as being a male who is less than 16 years old, and who has never expressed a preference for and/or shared content items including videos about makeup application).

Once the social networking system has identified candidate content items eligible for presentation to the viewing user, the social networking system may identify candidate content items that are associated with topics having start times and/or end times ("time-specific candidate content items") and adjust their associated affinity scores. The affinity scores associated with time-specific candidate content items may be adjusted based on the start times and/or the end times associated with their topics. For example, the social networking system applies a time decay to the affinity score associated with a time-specific candidate content item by comparing an end time associated with a topic of the candidate content item with the current time, such that the affinity score is decreased in proportion to the amount of time that has elapsed since the end time.

The social networking system then selects one or more candidate content items for presentation to the viewing user based on the affinity score associated with each candidate content item. For example, the social networking system ranks candidate content items eligible for presentation to a viewing user based on the affinity scores associated with each candidate content item (e.g., using the adjusted affinity scores associated with each time-specific candidate content item). In this example, candidate content items associated with higher affinity scores are ranked higher than candidate content items associated with lower affinity scores and the social networking system selects one or more candidate content items associated with at least a threshold ranking or affinity score for presentation to the viewing user.

In some embodiments, the social networking system determines the start time and/or the end time associated with a topic based on information received from a user of the social networking system. For example, if the social networking system receives a request from a user to generate a content item including a photo uploaded by the user to the social networking system, the social networking system may prompt the user to specify an explicit start time and/or an explicit end time for a topic associated with the content item (e.g., a birthday party at which the photo was taken). The start time and/or the end time associated with a topic may be a future time. In the above example, if the photo was taken during the previous year and is being uploaded in anticipation of an upcoming birthday party for the same person, the start time specified by the user may be the time of the upcoming party, such that the content item is not eligible for presentation to viewing users until the start time. The social networking system may provide a dashboard that allows users to specify topics and start times and/or end times associated with topics. For example, the dashboard may include a calendar that allows a user to specify a topic and a start time and an end time associated with the topic. As an additional example, a default start time may be associated with a topic (e.g., the current time) and the dashboard may include a drop-down menu with predefined time intervals from which the user may select an end time (e.g., one day from now, one week from now, etc.).

In various embodiments, the start time and/or the end time associated with a topic is determined by the social networking system based on the occurrence of an event associated with the topic. For example, an announcement made by a committee associated with the Titans of Mavericks™ surf competition triggers the setting of a start time associated with the topic of the competition, which corresponds to the time of the announcement. As an additional example, the setting of a start time associated with a camping trip is triggered when a user attending the camping trip arrives at a location associated with the trip (e.g., camping grounds at a national park) and is set to correspond to the time of the user's arrival. In the above example, the setting of an end time associated with the trip is triggered if the user is at least a threshold distance from the location associated with the trip for at least a threshold amount of time and is set to correspond to the time at which the user is the threshold distance from the location.

The social networking system also may determine a start time and/or an end time associated with a topic based on patterns of user interactions with content items associated with the topic over time. For example, since users may share, comment on, and click on content items associated with a television show more frequently during times when new episodes of the show are airing than during times when only reruns of the show are airing, the social networking system may determine a start time and an end time associated with the topic of the latest season of the television show based on the changes in the frequencies of such interactions among a group of users (e.g., users living in a particular geographic location). In the above example, the social networking system monitors the frequencies of the interactions and sets the start time associated with the topic to be the day that the average frequency of the interactions is at least the threshold frequency and sets the end time to be the day that the average frequency falls below the threshold frequency.

The social networking system may use various methods to adjust the affinity scores associated with time-specific candidate content items based on the start times and/or the end times for topics associated with the content items. In one embodiment, the social networking system determines a weight associated with a topic based on a start time and/or an end time associated with the topic and the current time; this weight is then applied to affinity scores associated with time-specific candidate content items associated with the topic. For example, the social networking system compares a start time and an end time associated with a topic with the current time; if the current time is within a time range defined by the start time and the end time associated with the topic, the social networking system determines a higher weight associated with the topic than if the current time is outside of the time range defined by the start time and the end time. In this example, the social networking system then applies the weight to the affinity scores of time-specific candidate content items associated with the topic, such that the time-specific candidate content items are associated with higher affinity scores if the topic is associated with a time range that includes the current time and the time-specific candidate content items are associated with lower affinity scores if the topic is associated with a time range that does not include the current time. In one embodiment, the social networking system may determine the weight associated with a topic by applying a time decay by comparing an end time for the topic with the current time, such that the weight decreases as the amount of time elapsed since the end time associated with the topic increases.

In addition to applying a weight to adjust affinity scores associated with time-specific candidate content items, in some embodiments, the social networking system may apply a discount to affinity scores associated with time-specific candidate content items. In such embodiments, the social networking system determines the value of a discount applied to the affinity score for a time-specific candidate content item based on the start time and/or the end time for a topic associated with the time-specific candidate content item and the current time. For example, if the current time is after an end time for a topic associated with a time-specific candidate content item, the social networking system may discount an affinity score associated with the time-specific candidate content item by a predetermined value. Similar to the weight determined by the social networking system, the social networking system may determine the value by which an affinity score is discounted by applying a time decay. For example, based on a comparison of an end time for a topic with the current time, the value of a discount applied to the affinity score for a time-specific candidate content item associated with the topic increases as the amount of time elapsed since the end time increases.

In some embodiments, the social networking system may adjust the affinity scores associated with time-specific candidate content items such that the start times and/or the end times associated with topics may serve as absolute cutoff times when selecting content items for presentation to a viewing user. For example, if time-specific candidate content items are associated with future start times, the social networking system may assign a null value to the affinity scores associated with such candidate content items. As an additional example, the social networking system may assign an affinity score of zero to time-specific candidate content items that are associated with end times that have passed. In the above examples, the social networking system may avoid selecting content items associated with affinity scores of zero or null for presentation to a viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
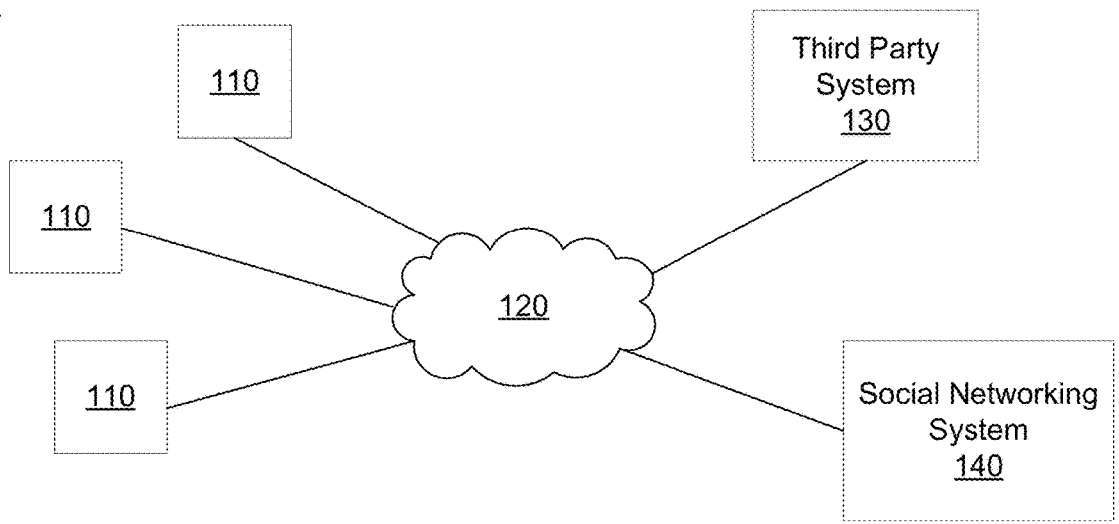
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein may be adapted to online systems systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API)

running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 also may communicate information to the social networking system 140, such as advertisements, content, or information about an application provided by the third party system 130.

Figure 2:
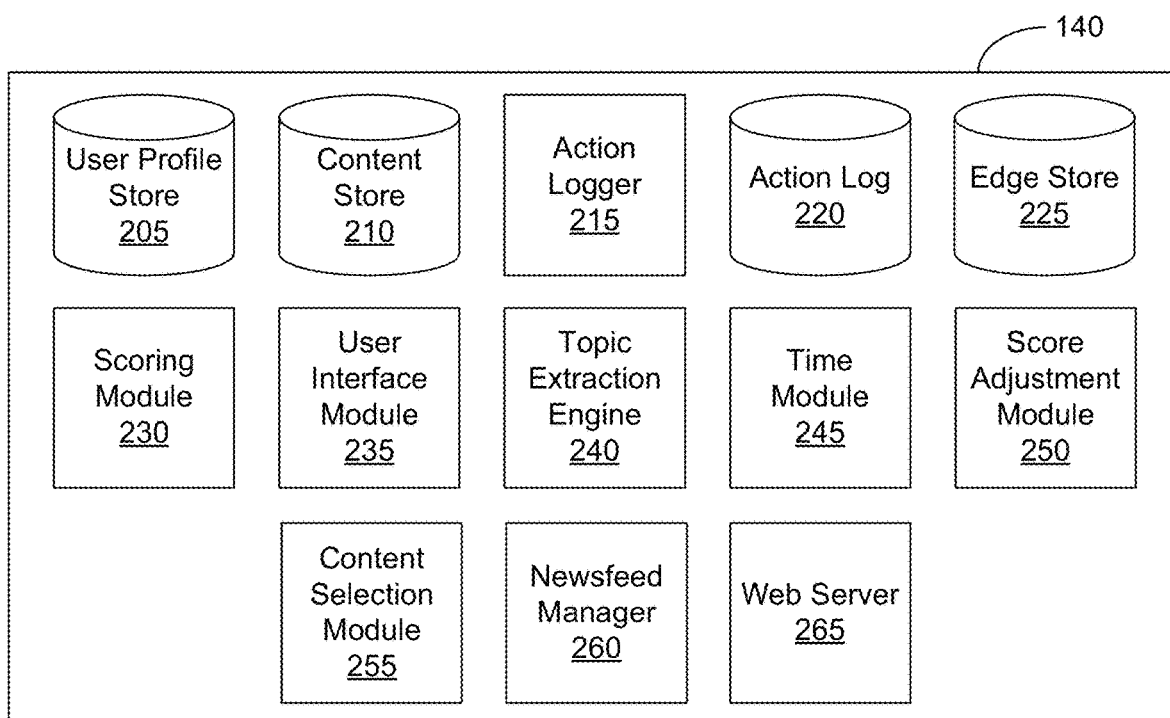
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a scoring module 230, a user interface module 235, a topic extraction engine 240, a time module 245, a score adjustment module 250, a content selection module 255, a newsfeed manager 260, and a web server 265. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and also may include profile information inferred by the social networking system 140. In one embodiment, a user profile includes multiple data fields, each describing one or more user attributes of the corresponding social networking system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the social networking system users displayed in an image. A user profile in the user profile store 205 also may maintain references to actions by the corresponding user performed on content items in the content store 210 and stored in the action log 220.

While user profiles in the user profile store 205 are frequently associated with individuals, allowing individuals to interact with each other via the social networking system 140, user profiles also may be stored for entities such as businesses or organizations. This allows an entity to establish a presence in the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions in the social networking system 140, as well as actions in the third party system 130 that communicate information to the social networking system 140. Users may interact with various objects in the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the social networking system 140 as well as with other applications operating in the social networking system 140. In some embodiments, data from the action log 220 is used to infer interests or preferences of a user, augmenting the interests included in the user's user profile and allowing a more complete understanding of user preferences.

The action log 220 also may store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the social networking system 140.

In one embodiment, the edge store 225 stores information describing connections between users and other objects in the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page in the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The scoring module 230 computes (e.g., as shown in step 320 of FIG. 3) affinity scores associated with candidate content items eligible for presentation to viewing users of the social networking system 140. An affinity score indicates a predicted affinity of a viewing user for a candidate content item. The scoring module 230 may compute an affinity score associated with a candidate content item based on information associated with the candidate content item and information associated with a viewing user, such as declarative information that was explicitly shared by the viewing user, information describing historical actions performed by the viewing user in the social networking system 140, or any other suitable information associated with the viewing user that may indicate an affinity of the viewing user for the candidate content item. For example, the scoring module 230 may predict that a viewing user has a high affinity for a candidate content item associated with dog training if profile information associated with the viewing user (e.g., retrieved from the user profile store 205) indicates the viewing user likely has an interest in dog training (e.g., the viewing user is a self-proclaimed dog person or a dog owner) or has an occupation related to dog training (e.g., the viewing user operates a dog training service or boarding facility). As an additional example, the scoring module 230 may predict that a viewing user has a low affinity for a content item including a video having the title, "how to marinate the perfect steak" based on the viewing user's interactions with the social networking system 140 (e.g., retrieved from the edge store 225 or the action log 220) indicating that the viewing user is unlikely to have an interest in cooking steak (e.g., joining a group maintained by the social networking system 140 for vegetarians). In the above examples, the scoring module 230 computes an affinity score for each content item that is proportional to the predicted affinity of the viewing user for the content item.

In some embodiments, the scoring module 230 identifies additional users of the social networking system 140 who have at least a threshold measure of similarity to a viewing user and computes an affinity score associated with a candidate content item based on the predicted affinities of the additional users for the candidate content item. The scoring module 230 may identify additional users having at least a threshold measure of similarity to the viewing user based on attributes shared by the additional users and the viewing user. For example, the scoring module 230 retrieves information from the user profile store 205 describing profile information associated with a viewing user and profile information associated with additional users of the social networking system 140 as well as information from the edge store 225 and the action log 220 describing actions performed by the viewing user and the additional users with objects maintained by the social networking system 140 (e.g., content items, pages, other users). In this example, if the viewing user is a female California resident between the ages of 18 and 25 who has an interest in cooking, figure skating, and reading romance novels, the scoring module 230 identifies additional users who are also female residents of California between the ages of 18 and 25 and who share at least one interest in common with the viewing user to be social networking system users having at least a threshold measure of similarity to the viewing user.

Once the scoring module 230 has identified additional users of the social networking system 140 having at least a threshold measure of similarity to a viewing user, the scoring module 230 may compute an affinity score indicating an affinity of a viewing user for a candidate content item based on the predicted affinities of the additional users for the candidate content item. For example, the scoring module 230 computes an affinity score indicating an affinity of a viewing user for a candidate content item by first predicting the affinities of each additional user for the candidate content item (e.g., based on information associated with the candidate content item and each additional user, as described above). In this example, the scoring module 230 then computes the affinity score indicating an affinity of the viewing user for the candidate content item that is proportional to an average of the predicted affinities of the additional users for the candidate content item. The functionality of the scoring module 230 is further described below in conjunction with FIG. 3.

The user interface module 235 generates a user interface (e.g., a dashboard) that allows users of the social networking system 140 to provide inputs that specify topics, start times, and/or end times associated with the topics. For example, the user interface module 235 may generate a dashboard that allows a user creating a content item to specify a topic associated with the content item (e.g., using a hashtag) and includes a calendar that allows the user to specify a start time and/or an end time associated with the topic. As an additional example, the user interface module 235 may generate a dashboard that specifies a default start time associated with a topic (e.g., the current time) and includes a drop-down menu or radio buttons associated with predefined time intervals from which a user may select an end time (e.g., one day from now, one week from now, etc.). In some embodiments, the user interface generated by the user interface module 235 allows a social networking system user to edit a start time and/or an end time associated with a topic. For example, if the original end time associated with a topic of a vacation was two days after the current date and the trip is cut short, the user interface may allow a user of the social networking system 140 to update the end time associated with the topic to be the current date. The functionality of the user interface module 235 is further described below in conjunction with FIGS. 3 and 4.

The social networking system 140 includes a topic extraction engine 240, which identifies (e.g., as shown in step 330 of FIG. 3) one or more topics associated with objects in the content store 210. To identify topics associated with content items, the topic extraction engine 240 identifies anchor terms included in a content item and determines a meaning of the anchor terms as further described in U.S. patent application Ser. No. 13/167,701, filed Jun. 24, 2011 (U.S. Publication No. US 2012/0331063 A1, published on Dec. 27, 2012), which is hereby incorporated by reference in its entirety. For example, the topic extraction engine 240 determines one or more topics associated with a content item maintained in the content store 210. The one or more topics associated with a content item are stored and associated with an object identifier corresponding to the content item. In various embodiments, associations between object identifiers and topics are stored in the topic extraction engine 240 or in the content store 210 to simplify retrieval of one or more topics associated with an object identifier or retrieval of object identifiers associated with a specified topic. Structured information associated with a content item also may be used to extract a topic associated with the content item. The functionality of the topic extraction engine 240 is further described below in conjunction with FIG. 3.

The time module 245 determines (e.g., as shown in step 325 of FIG. 3) a start time and/or an end time associated with a topic. The start time and/or the end time associated with a topic indicate a time during which the topic is most likely to be relevant to viewing users of the social networking system 140. For example, since the topic of Valentine's Day is more likely to be relevant to social networking system users during the weeks leading up to and including the day of the holiday than during other times of the year, a start time associated with the topic may be two weeks before Valentine's Day while an end time associated with the topic may be the day after Valentine's Day. As an additional example, a topic related to a newly-formed organization may be associated with only a start time (e.g., the day the organization was formed) while a topic related to a company may be associated with only an end time (e.g., the day the company was bought out by another company).

In some embodiments, a topic may be associated with multiple start times and/or end times. For example, a topic related to a play may be associated with a first start time (e.g., the day that tickets to the play are available for purchase) and a first end time (e.g., the day that tickets to the play are sold out). In this example, the topic also may be associated with a second start time (e.g., the day of the play's opening night) and a second end time (e.g., the day of the play's closing night).

The start time and/or the end time associated with a topic may be a time in the past. For example, if a topic is associated with an event that is ongoing (e.g., the second day of a fundraising walk that lasts three days), the start time associated with the topic may be the day that the event began. Similarly, the start time and/or the end time associated with a topic also may be a time in the future. For example, if a topic is associated with a grand opening of a hotel and the grand opening has not yet occurred, the start time may be the time of the grand opening.

In some embodiments, the time module 245 may determine the start time and/or the end time associated with a topic based on information received from a user of the social networking system 140. For example, if the social networking system 140 receives a request from a user to generate a content item including a video uploaded by the user to the social networking system 140, the social networking system 140 may prompt the user to specify an explicit start time for a topic associated with the content item (e.g., the date the video was recorded) and/or an explicit end time associated with the topic (e.g., one week after the video was recorded). In this example, the time module 245 may determine that the start time and/or the end time for the topic correspond to the explicit start time and/or the explicit end time specified by the user. The social networking system 140 may receive information from a user of the social networking system 140 specifying start times and/or end times associated with topics from a user interface (e.g., a dashboard generated by the user interface module 235) that is presented to the user. For example, a dashboard presented to a social networking system user may include input fields (e.g., text boxes) that allow the social networking system 140 to receive information from the user specifying a start time and an end time associated with a topic.

In various embodiments, the time module 245 may determine the start time and/or the end time associated with a topic based on the occurrence of an event associated with the topic. For example, the signing of an executive order by the President of the U.S. triggers the setting of a start time associated with the topic of the executive order, which is set to correspond to the time of the signing. As an additional example, the setting of a start time associated with a charity event is triggered if a user organizing the event arrives at a location associated with the event (e.g., a hotel or other venue), which is set to correspond to the time at which the user arrives at the location. In this example, the setting of an end time associated with the event is triggered if the user is at least a threshold distance from the location for at least a threshold amount of time and is set to correspond to the time at which the user is the threshold distance from the location.

The time module 245 also may determine a start time and/or an end time associated with a topic based on patterns of user interactions with content items associated with the topic over time. For example, since users may share, comment on, and click on content items associated with a fashion trend more frequently during times when the trend is in style than during times when the trend is not in style, the time module 245 may determine a start time and an end time associated with the topic of the fashion trend based on changes in the frequencies of such interactions among a group of users (e.g., users living in a particular geographic location). In the above example, the time module 245 monitors the frequencies of the interactions and sets the start time associated with the topic to be the day that the average frequency of one or more of the interactions is at least the threshold frequency and sets the end time to be the day that the average frequency falls below the threshold frequency. The functionality of the time module 245 is further described below in conjunction with FIG. 3.

The score adjustment module 250 adjusts (e.g., as shown in step 340 of FIG. 3) the affinity scores associated with time-specific candidate content items, according to an embodiment, as described below. In other embodiments, the scoring module 230 performs these functions as well. The score adjustment module 250 may adjust the score associated with time-specific candidate content items based on start times and/or end times associated with their topics. In some embodiments, the score adjustment module 250 compares (e.g., as shown in step 335 of FIG. 3) a start time and/or an end time associated with a topic with a current time and adjusts the affinity score associated with a time-specific candidate content item based at least in part on the comparison. For example, the score adjustment module 250 compares the start time and/or the end time associated with a topic with the current time by determining whether either or both of the times are before or after the current time and an amount of time that has elapsed between the start time and/or the end time and the current time. In this example, if the topic is associated with a start time that is before the current time and/or an end time that is after the current time, since the topic is more likely to be relevant to a viewing user, the score adjustment module 250 adjusts the affinity score associated with a time-specific candidate content item associated with the topic by increasing its affinity score. Alternatively, if the topic is associated with a start time that is after the current time and/or an end time that is before the current time, since the topic is less likely to be relevant to a viewing user, the score adjustment module 250 adjusts the affinity score associated with a time-specific candidate content item associated with the topic by decreasing its affinity score.

In one embodiment, the score adjustment module 250 determines a weight associated with a topic based on a comparison of a start time and/or an end time for the topic with the current time and applies the weight to affinity scores associated with time-specific candidate content items associated with the topic. For example, the score adjustment module 250 compares a start time and an end time for a topic with the current time; if the current time is within a time range defined by the start time and the end time associated with the topic, the score adjustment module 250 determines a greater weight associated with the topic than if the current time is outside of the time range defined by the start time and the end time. In this example, the score adjustment module 250 then applies the weight to the affinity scores of time-specific candidate content items associated with the topic, such that the time-specific candidate content items are associated with higher affinity scores if the topic is associated with a time range that includes the current time and the time-specific candidate content items are associated with lower affinity scores if the topic is associated with a time range that does not include the current time. The score adjustment module 250 may determine the weight associated with a topic by applying a time decay by comparing an end time for the topic with the current time, such that the weight is inversely proportional to an amount of time that has elapsed since the end time. For example, the score adjustment module 250 may determine a weight of 0.8 for a topic one day after the end time associated with the topic, a weight of 0.6 for a topic two days after the end time, a weight of 0.4 for a topic three days after the end time, a weight of 0.2 for a topic four days after the end time, and a weight of 0 for a topic five days after the end time.

In another embodiment, the score adjustment module 250 may discount affinity scores associated with time-specific candidate content items by a value that is determined based on a comparison of the current time with a start time and/or an end time for a topic associated with the time-specific candidate content items. For example, if the current time is after an end time for a topic associated with a time-specific candidate content item, the score adjustment module 250 may discount an affinity score associated with the time-specific candidate content item by a predetermined value. The score adjustment module 250 may determine the value by which an affinity score is discounted by applying a time decay based on an end time associated with the topic, such that the discount increases as the amount of time elapsed since the end time associated with the topic increases (i.e., the affinity score decreases as the amount of time elapsed increases).

In some embodiments, the score adjustment module 250 may adjust the affinity scores associated with time-specific candidate content items by assigning them a particular score or value. For example, if time-specific candidate content items are associated with future start times, the score adjustment module 250 may assign a null value to the affinity scores associated with such candidate content items. As an additional example, the score adjustment module 250 may assign an affinity score of zero to time-specific candidate content items that are associated with end times that have passed.

The score adjustment module 250 may adjust the affinity score associated with a time-specific candidate content item based on a comparison of the current time with a start time and/or an end time for each of multiple topics associated with the time-specific candidate content item. For example, if a time-specific candidate content item is associated with two topics (e.g., identified by the topic extraction engine 240), each topic may be associated with a start time and/or an end time. In this example, the score adjustment module 250 may compare the current time with each start time and/or each end time associated with the time-specific candidate content item and determine a weight or a discount value associated with each topic. The score adjustment module 250 may then determine an average of the weights/discount values and apply the average weight/average discount value to the affinity score associated with the time-specific candidate content item. In some embodiments, if any topic associated with a time-specific candidate content item is associated with an end time that has passed or a start time in the future, the score adjustment module 250 may adjust the affinity score associated with the time-specific candidate content item based only on the start times and/or the end times associated with such topics. In the above example, if either of the topics is associated with end times that have passed or start times in the future, the score adjustment module 250 may assign a null value or a score of zero to the affinity score associated with the time-specific candidate content item. The functionality of the user score adjustment module 250 is further described below in conjunction with FIG. 3.

The content selection module 255 selects (e.g., as shown in step 350 of FIG. 3) one or more content items for communication to a client device 110 to be presented to a user. Content items (e.g., advertisements) eligible for presentation to the user are retrieved from the content store 210 or from another source by the content selection module 255, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 255 includes content items eligible for presentation to the user in one or more content selection processes, which identify a set of content items for presentation to the viewing user. For example, the content selection module 255 determines measures of relevance of various content items to the user based on characteristics associated with the user by the social networking system 140 and based on the user's affinity for different content items. Based on the measures of relevance, the content selection module 255 selects content items for presentation to the user. As an additional example, the content selection module 255 selects content items having the highest measures of relevance or having at least a threshold measure of relevance for presentation to the user. Alternatively, the content selection module 255 ranks (e.g., as shown in step 345 of FIG. 3) content items based on their associated measures of relevance and selects content items having the highest positions in the ranking or having at least a threshold position in the ranking for presentation to the user.

Content items selected for presentation to the user may include advertisements or other content items associated with bid amounts. The content selection module 255 may use the bid amounts associated with advertisements when selecting content for presentation to a user. In various embodiments, the content selection module 255 determines an expected value associated with various advertisements (or other content items) based on their bid amounts and selects content items associated with a maximum expected value or associated with at least a threshold expected value for presentation. An expected value associated with an advertisement or with a content item represents an expected amount of compensation to the social networking system 140 for presenting an advertisement or a content item. For example, the expected value associated with an advertisement is a product of the advertisement's bid amount and a likelihood of a user presented with the ad content from the advertisement interacting with the ad content. The content selection module 255 may rank advertisements based on their associated bid amounts and select advertisements having at least a threshold position in the ranking for presentation to a user. In some embodiments, the content selection module 255 ranks both content items not associated with bid amounts and advertisements in a unified ranking based on bid amounts associated with advertisements and measures of relevance associated with content items and advertisements. Based on the unified ranking, the content selection module 255 selects content for presentation to the user. Selecting advertisements and other content items through a unified ranking is further described in U.S. patent application Ser. No. 13/545,266, filed on Jul. 10, 2012 (U.S. Publication No. US2014/0019261 A1, published on Jan. 16, 2014), which is hereby incorporated by reference in its entirety.

For example, the content selection module 255 receives a request to present a feed of content to a user of the social networking system 140. The feed may include one or more advertisements as well as content items, such as stories describing actions associated with other social networking system users connected to the user. The content selection module 255 accesses one or more of the user profile store 205, the content store 210, the action log 220, and the edge store 225 to retrieve (e.g., as shown in step 310 of FIG. 3) information about the user. For example, stories or other data associated with users connected to the identified user are retrieved. Additionally, one or more advertisements may be retrieved from the content store 210. The retrieved stories, advertisements, or other content items, are analyzed by the content selection module 255 to identify (e.g., as shown in step 315 of FIG. 3) candidate content that is likely to be relevant to the identified user. For example, stories associated with users not connected to the identified user or stories associated with users for which the identified user has less than a threshold affinity are discarded as candidate content. Based on various criteria, the content selection module 255 selects one or more of the content items or advertisements identified as candidate content for presentation to the identified user. The selected content items or advertisements may be included in a feed of content that is presented to the user. For example, the feed of content includes at least a threshold number of content items describing actions associated with users connected to the user via the social networking system 140.

In various embodiments, the social networking system 140 presents content to a user through a newsfeed including a plurality of content items selected for presentation to the user. One or more advertisements also may be included in the feed. The content selection module 255 may determine the order in which selected content items or advertisements are presented via the feed. For example, the content selection module 255 orders content items or advertisements in the feed based on likelihoods of the user interacting with various content items or advertisements.

In some embodiments, the content selection module 255 identifies (e.g., as shown in step 330 of FIG. 3) candidate content items that are associated with particular topics having start times and/or end times (i.e., "time-specific candidate content items"). For example, the content selection module 255 accesses the content store 210 to determine whether various candidate content items are stored in association with information describing start times and/or end times for one or more topics associated with each candidate content item. In this example, the content selection module 255 identifies candidate content items stored in association with information describing a start time and/or an end time to be time-specific candidate content items. In some embodiments, the content selection module 255 may use the start time and/or the end time associated with a topic as an absolute cutoff time when selecting content items for presentation to a viewing user. For example, the content selection module 255 may avoid selecting time-specific candidate content items that are associated with future start times for presentation to a viewing user. As an additional example, the content selection module 255 may avoid selecting time-specific candidate content items that have been assigned affinity scores of zero or null values (e.g., by the score adjustment module 250) for presentation to a viewing user. The functionality of the content selection module 255 is further described below in conjunction with FIGS. 3 and 5.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user who performed the action. The newsfeed manager 260 may generate stories for presentation to a user based on information in the action log 220 and in the edge store 225 or may select candidate stories included in the content store 210. One or more of the candidate stories are selected and presented to a user by the newsfeed manager 260.

For example, the newsfeed manager 260 receives a request to present one or more stories to a social networking system user. The newsfeed manager 260 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 260 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 260 selects one or more of the candidate stories for presentation to the identified user.

In various embodiments, the newsfeed manager 260 presents (e.g., as shown in step 355 of FIG. 3) stories to a user through a newsfeed including a plurality of stories selected for presentation to the user. The newsfeed may include a limited number of stories or may include a complete set of candidate stories. The number of stories included in a newsfeed may be determined in part by a user preference included in the user profile store 205. The newsfeed manager 260 also may determine the order in which selected stories are presented via the newsfeed. For example, the newsfeed manager 260 determines that a user has a highest affinity for a specific user and increases the number of stories in the newsfeed associated with the specific user or modifies the positions in the newsfeed where stories associated with the specific user are presented.

The newsfeed manager 260 also may account for actions by a user indicating a preference for types of stories and selects stories having the same, or similar, types for inclusion in the newsfeed. Additionally, the newsfeed manager 260 may analyze stories received by the social networking system 140 from various users to obtain information about user preferences or actions from the analyzed stories. This information may be used to refine subsequent selection of stories for newsfeeds presented to various users.

The web server 265 links the social networking system 140 via the network 120 to the one or more client devices 110, as well as to the third party system 130 and/or one or more third party systems. The web server 265 serves web pages, as well as other content, such as JAVA®, FLASH®, XML and so forth. The web server 265 may receive and route messages between the social networking system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Selecting Time-Specific Content for Presentation to a Viewing User

Figure 3:
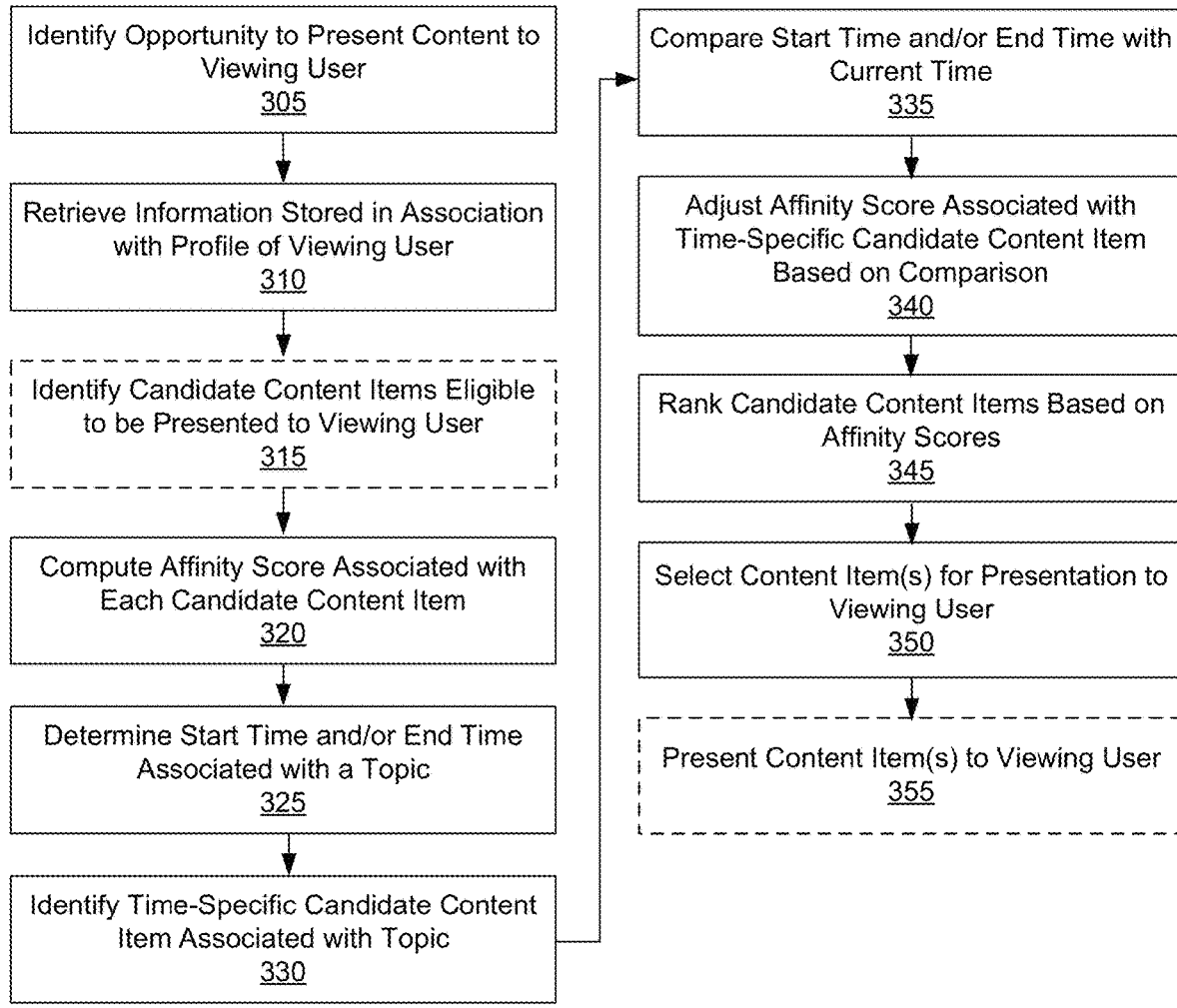
FIG. 3 is a flow chart of a method for selecting time-specific content for presentation to a viewing user of a social networking system, in accordance with an embodiment.

FIG. 3 is a flow chart of a method for selecting time-specific content for presentation to a viewing user of a social networking system according to one embodiment. In other embodiments, the method may include different and/or additional steps than those shown in FIG. 3. Additionally, steps of the method may be performed in a different order than the order described in conjunction with FIG. 3.

The social networking system 140 identifies 305 an opportunity to present content to a viewing user of the social networking system 140. The social networking system 140 may identify 305 an opportunity to present content to the viewing user upon receiving a request to present content (e.g., a feed of content items) to the viewing user. For example, the social networking system 140 identifies 305 an opportunity to present a newsfeed to the viewing user upon receiving a request from the viewing user to log in to the social networking system 140 after the social networking system 140 has verified credentials provided by the viewing user to access an account maintained by the social networking system 140 that is associated with the viewing user.

The social networking system 140 retrieves 310 (e.g., using the content selection module 255) information stored in association with a profile of the viewing user. The information retrieved 310 by the social networking system 140 may include information describing attributes associated with the viewing user. Examples of attributes associated with the viewing user include declarative information about the viewing user that was explicitly shared by the viewing user, historical actions performed by the viewing user in the social networking system 140, or any other suitable information associated with the viewing user. For example, information describing the viewing user's age, gender, occupation, and hometown stored in association with a profile of the viewing user may be retrieved 310 from the user profile store 205. As an additional example, information describing relationships between the viewing user and additional users of the social networking system 140 (e.g., friendships, familial relationships, co-workers, etc.) may be retrieved 310 from the edge store 225 (e.g., information stored in association with each of the connections).

Attributes associated with the viewing user also may include one or more topics in which the viewing user has expressed an interest. Topics may include subject matter associated with content items such as sports, movies, music, celebrities, hobbies, books, political views, religions, areas of study, or any other suitable subject matter that may be associated with a content item. For example, information describing the viewing user's favorite movies, books, and hobbies may be retrieved from the user profile store 205. As an additional example, information stored in association with a connection between a content item and the viewing user describing various actions performed by the viewing user with the content item (e.g., expressing a preference for, sharing, or commenting on the content item) may be retrieved from the edge store 225. In this example, information describing one or more topics associated with the content item may be retrieved from the content store 210 (e.g., tags or other metadata associated with the content item). Alternatively, in the above example, the information describing each action performed by the viewing user with the content item may be retrieved from the action log 220, where each action performed by the viewing user is stored as a separate entry in one or more tables.

Some topics associated with content items may be more likely to be relevant to social networking system users during certain times than other times. For example, content items associated with the topics of allergy season and parkas are more likely to be relevant to social networking system users during the spring season and the winter season, respectively. As an additional example, content items associated with a sale at a department store are more likely to be relevant to social networking system users during the sale, but are not as likely to be relevant to the users after the sale has ended.

In some embodiments, the social networking system 140 identifies 315 (e.g., using the content selection module 255) candidate content items eligible for presentation to the viewing user. Candidate content items may be identified 315 based on targeting criteria associated with each content item that specify one or more attributes of social networking system users eligible to be presented with the content item. Attributes specified by targeting criteria are usually associated with social networking system users who are likely to have an interest in content items with which the targeting criteria are associated or who are likely to find such content items relevant. For example, a content item associated with a particular brand of luxury handbag is associated with targeting criteria describing social networking system users who are female, who are at least 18 years old, and who have expressed a preference for content items associated with the brand or with handbags or for a page maintained by the social networking system 140 for the brand.

The social networking system 140 may compare targeting criteria associated with various content items with attributes associated with the viewing user and identify 315 content items associated with targeting criteria satisfied by the viewing user as candidate content items. For example, targeting criteria associated with a content item may specify an age range and a gender associated with social networking system users, as well as a physical location associated with the content item and a threshold distance. In this example, the social networking system 140 identifies 315 the content item as a candidate content item if the viewing user is associated with an age and the gender specified by the targeting criteria and if a client device 110 associated with the viewing user is within at least the threshold distance of the physical location.

The social networking system 140 computes 320 (e.g., using the scoring module 230) an affinity score associated with each candidate content item. The affinity score computed 320 by the social networking system 140 indicates a predicted affinity of the viewing user for a candidate content item. In some embodiments, the social networking system 140 computes 320 an affinity score associated with a candidate content item based on information associated with the candidate content item and the information stored in association with a profile of the viewing user. For example, the social networking system 140 may predict that a viewing user has a high affinity for a content item associated with a sitcom if profile information associated with the viewing user (e.g., retrieved from the user profile store 205) indicates the viewing user's favorite show is the sitcom or that the viewing user's favorite actor is the star of the sitcom or if information stored in association with a connection between the viewing user and a group of users maintained by the social networking system 140 (e.g., retrieved from the edge store 225) indicates that the viewing user is a member of the group and that the group is associated with the sitcom (e.g., a group for fans of the sitcom). As an additional example, the social networking system 140 may predict that a viewing user has a low affinity for a content item about baby strollers if information associated with the viewing user indicates that the viewing user is unlikely to have a baby or young children (e.g., if information retrieved from the user profile store 205 indicates that the viewing user is either 18 years old or younger or 50 years old or older). In the above examples, the social networking system 140 computes 320 an affinity score for each content item that is proportional to the predicted affinity of the viewing user for the content item.

In various embodiments, to compute 320 an affinity score for each candidate content item, the social networking system 140 identifies additional users of the social networking system 140 who have at least a threshold measure of similarity to the viewing user and computes 320 the affinity score associated with a candidate content item based on the predicted affinities of the additional users for the candidate content item. For example, if the viewing user is a new user of the social networking system 140 or does not frequently log in to the social networking system 140, such that the social networking system 140 has insufficient information to predict an affinity of the viewing user for a candidate content item, the social networking system 140 may identify additional users having at least a threshold measure of similarity to the viewing user based on attributes shared by the additional users and the viewing user. Additional users of the social networking system 140 who have at least a threshold measure of similarity to the viewing user may be identified based on information maintained by the social networking system 140 associated with the viewing user and the additional users. For example, if the viewing user is associated with the following attributes: 1) married, 2) male, 3) between the ages of 35 and 40, 4) lives in New York, 5) works in finance, and 6) enjoys kayaking, the social networking system 140 identifies additional social networking system users who have at least a threshold measure of similarity to the viewing user to be users who share at least four of the six attributes associated with the viewing user.

For each of the additional users identified by the social networking system 140, the social networking system 140 may predict an affinity of the additional user for each candidate content item; the social networking system may then compute 320 an affinity score for each candidate content item indicating an affinity of the viewing user for the candidate content item based on the predicted affinities. For example, the social networking system 140 computes 320 an affinity score indicating an affinity of the viewing user for a candidate content item by first predicting the affinities of each additional user for the candidate content item (e.g., based on information associated with the candidate content item and each additional user, as described above). In this example, the social networking system 140 then computes 320 the affinity score indicating an affinity of the viewing user for the candidate content item that is proportional to an average of the predicted affinities of the additional users for the candidate content item.

The social networking system 140 determines 325 (e.g., using the time module 245) a start time and/or an end time associated with a topic in which the viewing user has expressed an interest. The start time and/or the end time associated with a topic indicate a time during which the topic is likely to be relevant to the viewing user. For example, since the topic of St. Patrick's day is more likely to be relevant to social networking system users during the weeks leading up to and including the day of the holiday than during other times of the year, a start time associated with the topic may be two weeks before St. Patrick's Day while an end time associated with the topic may be the day after St. Patrick's Day. As an additional example, a topic related to a historic event may be associated with only a start time (e.g., the day the event occurred) while a topic related to a commercial product may be associated with only an end time (e.g., the day the product was discontinued).

In some embodiments, a topic may be associated with multiple start times and/or end times. For example, a topic related to a concert tour may be associated with a first start time (e.g., the day that tickets for the tour are available for purchase) and a first end time (e.g., the day that tickets for the tour are sold out). In this example, the topic also may be associated with a second start time (e.g., the first day of the tour) and a second end time (e.g., the last day of the tour).

The start time and/or the end time associated with a topic may be a time in the past. For example, if a topic is associated with an event that is ongoing (e.g., the third day of a convention that lasts four days), the start time associated with the topic may be the day that the event began. The start time and/or the end time associated with a topic also may be a time in the future. For example, if a topic is associated with a new mobile device and the mobile device will be unveiled at a convention that has not yet taken place, the start time associated with the topic may be the time that the convention ends.

In some embodiments, the social networking system 140 may determine 325 the start time and/or the end time associated with a topic based on information received from a user of the social networking system 140. For example, if the social networking system 140 receives a request from a user to generate a content item including a photo taken during a vacation that was uploaded by the user to the social networking system 140, the social networking system 140 may prompt the user to specify an explicit start time associated with a topic associated with the content item and/or an explicit end time associated with the topic. In this example, if the topic associated with the content item is the vacation, the user may specify an explicit start time (e.g., the date the vacation began) and an explicit end time (e.g., the last day of the vacation). The social networking system 140 may then determine 325 the start time and the end time associated with the topic, such that they correspond to the times specified by the user.

The social networking system 140 may receive information from a user of the social networking system 140 specifying start times and/or end times associated with topics from a user interface (e.g., a dashboard generated by the user interface module 235) that is presented to the user. In some embodiments, a user interface presented to a social networking system user may include interactive elements that allow the social networking system 140 to receive information from the user specifying a topic, a start time and/or an end time associated with the topic. For example, a dashboard presented to a social networking system user may specify a default start time associated with a topic (e.g., the current time) and includes a drop-down menu or radio buttons associated with predefined time intervals from which the user may select an end time (e.g., one day from now, one week from now, etc.).

Figure 4:
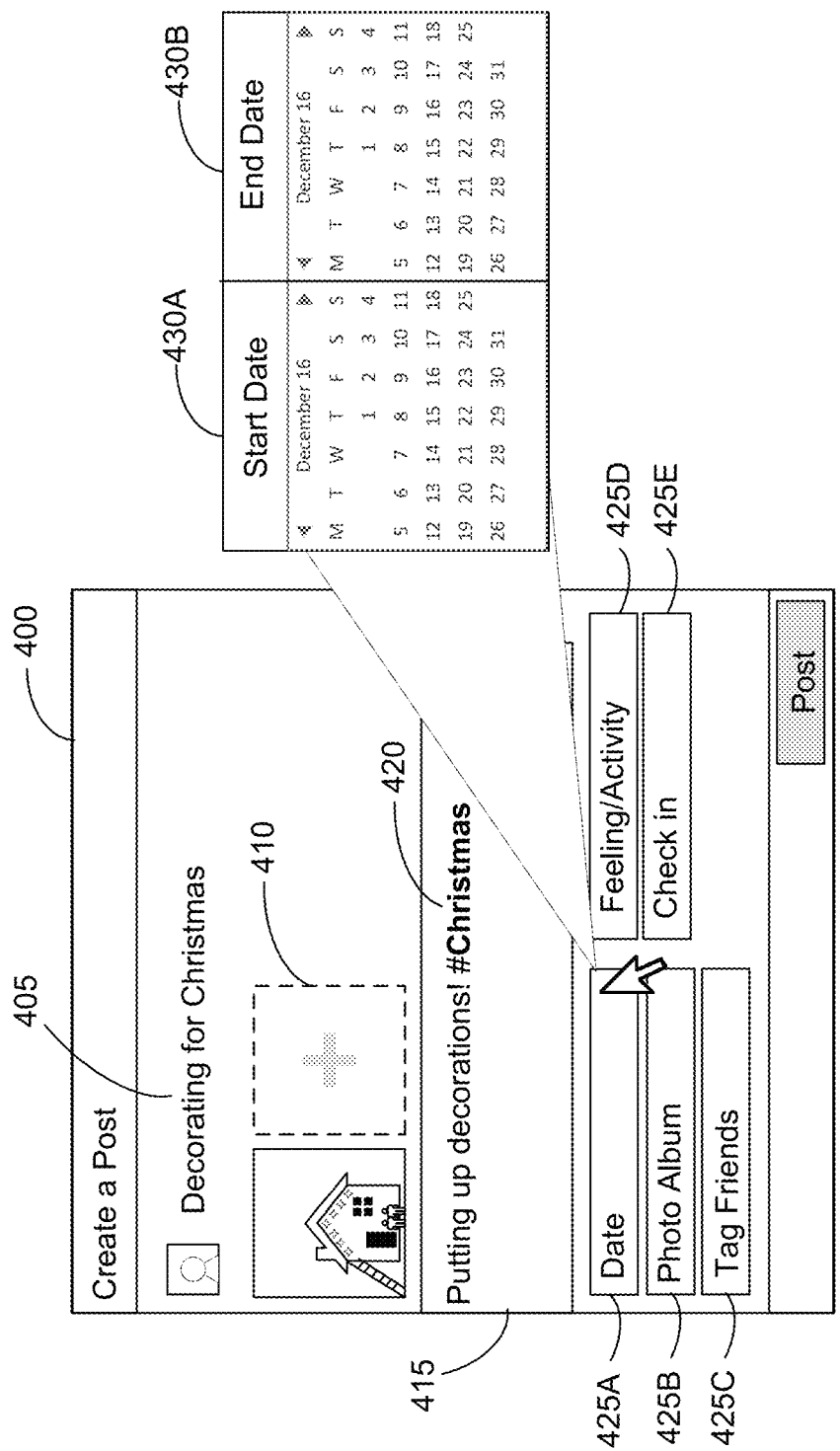
FIG. 4 is an example user interface for receiving information from a user of a social networking system specifying a start time and/or an end time associated with a topic, in accordance with an embodiment.

As shown in the example of FIG. 4, the dashboard may be presented to a social networking system user as part of a user interface that allows the user to create a content item/post 400. Portions of the dashboard may allow the user to create a title 405 associated with the content item, to upload an image or video 410 to be included in the content item, and to enter text 415 associated with the content item. The user may specify a topic associated with the content item, such as Christmas 420, using a hashtag associated with the topic. The dashboard also may include various buttons or other interactive elements 425A-E with which the user may interact. At least some of the interactive elements 425A-E may allow the user to specify one or more dates associated with the content item. For example, when a user interacts with a date button 425A, two calendars are displayed to the user— one calendar allowing the user to select a start date 430A and another calendar allowing the user to select an end date 430B for a topic associated with the content item. The user may then select dates from the calendars specifying the start date 430A and/or the end date 430B associated with the topic. In some embodiments, the user interface allows a social networking system user to edit a start time and/or an end time associated with a topic. For example, if the original start time associated with a topic of a farewell party was the day of the party, but the party is rescheduled, the user interface may allow a user of the social networking system 140 to update the start time associated with the topic to be the date for which the party was rescheduled.

In various embodiments, the social networking system 140 may determine 325 the start time and/or the end time associated with a topic based on the occurrence of an event associated with the topic. For example, the release of a music album triggers the setting of a start time associated with the topic of the album, which is set to correspond to the time of the album release. As an additional example, the setting of a start time associated with a meeting is triggered if a user organizing the meeting arrives at a location associated with the meeting (e.g., a boardroom), which is set to correspond to the time at which the user arrives at the location. In the above example, setting of an end time associated with the meeting is triggered if the user is at least a threshold distance from the location for at least a threshold amount of time, which is set to correspond to the time at which the user is the threshold distance from the location.

The social networking system 140 also may determine 325 a start time and/or an end time associated with a topic based on patterns of user interactions with content items associated with the topic over time. For example, since users may share, comment on, and click on content items associated with a video more frequently during times when the video is going viral than during times when the video is not, the social networking system 140 may determine 325 a start time and an end time associated with the topic of the video based on changes in the frequencies of such interactions among a group of users (e.g., users living in a particular geographic location). In the above example, the social networking system 140 monitors the frequencies of the interactions and sets the start time associated with the topic to be the day that the frequency of one or more of the interactions is at least the threshold frequency and sets the end time to be the day that the frequency falls below the threshold frequency.

Referring back to FIG. 3, the social networking system 140 identifies 330 (e.g., via the topic extraction engine 240 and the content selection module 255) a time-specific candidate content item that is associated with the topic (i.e., the topic having the start time and/or the end time determined 325 above). For example, the social networking system 140 accesses the content store 210 to determine whether various candidate content items are stored in association with information describing the topic associated with the start time and/or the end time. In this example, a candidate content item stored in association with information describing the start time and/or the end time is identified 330 by the social networking system 140.

The social networking system 140 compares 335 (e.g., using the score adjustment module 250) the start time and/or the end time for the topic with the current time. For example, the social networking system 140 compares 335 the start time and/or the end time associated with a topic with the current time by determining whether either or both of the times are before or after the current time. As an additional example, the social networking system 140 may determine an amount of time that has elapsed between the start time and/or the end time associated with a topic and the current time.

The social networking system 140 adjusts 340 (e.g., using the score adjustment module 250) the affinity score associated with the time-specific candidate content item based at least in part on the comparison. In the above example, if the topic is associated with a start time that is before the current time and/or an end time that is after the current time, since the topic is more likely to be relevant to a viewing user, the social networking system 140 adjusts 340 the affinity score associated with a time-specific candidate content item associated with the topic by increasing its affinity score. Alternatively, if the topic is associated with a start time that is after the current time and/or an end time that is before the current time, since the topic is less likely to be relevant to a viewing user, the social networking system 140 adjusts 340 the affinity score associated with the time-specific candidate content item associated with the topic by decreasing its affinity score.

In one embodiment, the social networking system 140 determines a weight associated with the topic based on the comparison of the start time and/or the end time for the topic with the current time and applies the weight to the affinity score associated with the time-specific candidate content item associated with the topic. For example, based on the comparison, if the current time is within a time range defined by the start time and the end time associated with the topic, the social networking system 140 determines a greater weight associated with the topic than if the current time is outside of the time range defined by the start time and the end time. In this example, the social networking system 140 applies the weight to the affinity score for the time-specific candidate content item associated with the topic, such that the time-specific candidate content item is associated with a higher affinity score if the topic is associated with a time range that includes the current time; alternatively, the time-specific candidate content item is associated with a lower affinity score if the topic is associated with a time range that does not include the current time. The social networking system 140 may determine the weight associated with the topic by applying a time decay based on an end time associated with the topic, such that the weight is inversely proportional to an amount of time that has elapsed between the end time associated with the topic and the current time. For example, the social networking system 140 may determine a weight of 0.8 for a topic one day after the end time associated with the topic, a weight of 0.4 for a topic two days after the end time, a weight of 0.2 for a topic three days after the end time, and a weight of 0 for a topic four days after the end time.

In another embodiment, the social networking system 140 may discount the affinity score associated with the time-specific candidate content item by a value that is determined based on a comparison of the current time with the start time and/or the end time for the topic associated with the time-specific candidate content item; the discount is then applied to the affinity score associated with the time-specific candidate content item. For example, if the current time is after the end time for the topic associated with the time-specific candidate content item, the social networking system 140 may discount the affinity score associated with the time-specific candidate content item by a predetermined value. The social networking system 140 may determine the value by which the affinity score is discounted by applying a time decay based on an end time associated with the topic. For example, the amount by which the affinity score associated with the time-specific candidate content item is discounted increases as the amount of time elapsed since an end time for the topic associated with the time-specific candidate content item increases (i.e., the affinity score decreases as the amount of time elapsed increases).

In some embodiments, if the topic is associated with a start time that is after the current time and/or and end time that is before the current time, the social networking system 140 adjusts 340 the affinity score associated with the time-specific candidate content item by assigning it a particular score or value. For example, if the time-specific candidate content item is associated with a future start time, the social networking system 140 may assign a null value to the affinity score associated with the time-specific candidate content item. As an additional example, the social networking system 140 may assign an affinity score of zero to the time-specific candidate content item if it is associated with a topic having an end time that has passed.

The social networking system 140 may adjust 340 the affinity score associated with the time-specific candidate content item based on a comparison of the current time with a start time and/or an end time for each of multiple topics associated with the time-specific candidate content item. For example, if the time-specific candidate content item is associated with two topics (e.g., identified by the topic extraction engine 240), each topic may be associated with a start time and/or an end time. In this example, the social networking system 140 may compare 335 the current time with each start time and/or each end time associated with the time-specific candidate content item and determine a weight or a discount value associated with each topic. The social networking system 140 may then determine an average of the weights/discount values and apply the average weight/ average discount value to the affinity score associated with the time-specific candidate content item. In some embodiments, if any topic associated with a time-specific candidate content item is associated with an end time that has passed or a start time in the future, the social networking system 140 may adjust 340 the affinity score associated with the time-specific candidate content item based only on the start times and/or the end times associated with such topics. In the above example, if either of the topics is associated with an end time that has passed or a start time in the future, the social networking system 140 may assign a null value or a score of zero to the affinity score associated with the time-specific candidate content item.

The social networking system 140 ranks 345 (e.g., using the content selection module 255) the candidate content items based at least in part on the adjusted affinity score associated with the time-specific candidate content item. For example, the social networking system 140 ranks 345 candidate content items eligible for presentation to the viewing user based on the affinity scores associated with each candidate content item (e.g., using the adjusted affinity score associated with the time-specific candidate content item). In this example, candidate content items associated with higher affinity scores are ranked 345 higher than candidate content items associated with lower affinity scores. In addition to affinity scores, the social networking system 140 may rank 345 the candidate content items based on various additional factors as well. For example, the social networking system 140 may rank 345 candidate content items (e.g., advertisements) based on a bid amount associated with the candidate content items.

The social networking system 140 selects 350 (e.g., using the content selection module 255) one or more of the candidate content items for presentation to the viewing user based at least in part on the ranking. For example, the social networking system 140 selects 350 one or more candidate content items associated with at least a threshold ranking or affinity score for presentation to the viewing user. In some embodiments, the social networking system 140 may use the start time and/or the end time associated with a topic as an absolute cutoff time when selecting 350 content items for presentation to the viewing user. For example, the social networking system 140 may avoid selecting 350 time-specific candidate content items that are associated with future start times for presentation to the viewing user. As an additional example, the social networking system 140 may avoid selecting 350 time-specific candidate content items that were assigned an affinity score of zero or a null value for presentation to the viewing user.

The content items selected 350 by the social networking system 140 may be presented 355 (e.g., via the newsfeed manager 260) to the viewing user. For example, the social networking system 140 presents 355 the content items selected 350 for presentation to the viewing user in a newsfeed (e.g., via a client device 110 associated with the viewing user). In embodiments in which the content items are presented 355 in a feed of content items, the order in which the content items are presented 355 to the viewing user may be based on the order in which the selected 350 content items were ranked 345.

Figure 5:
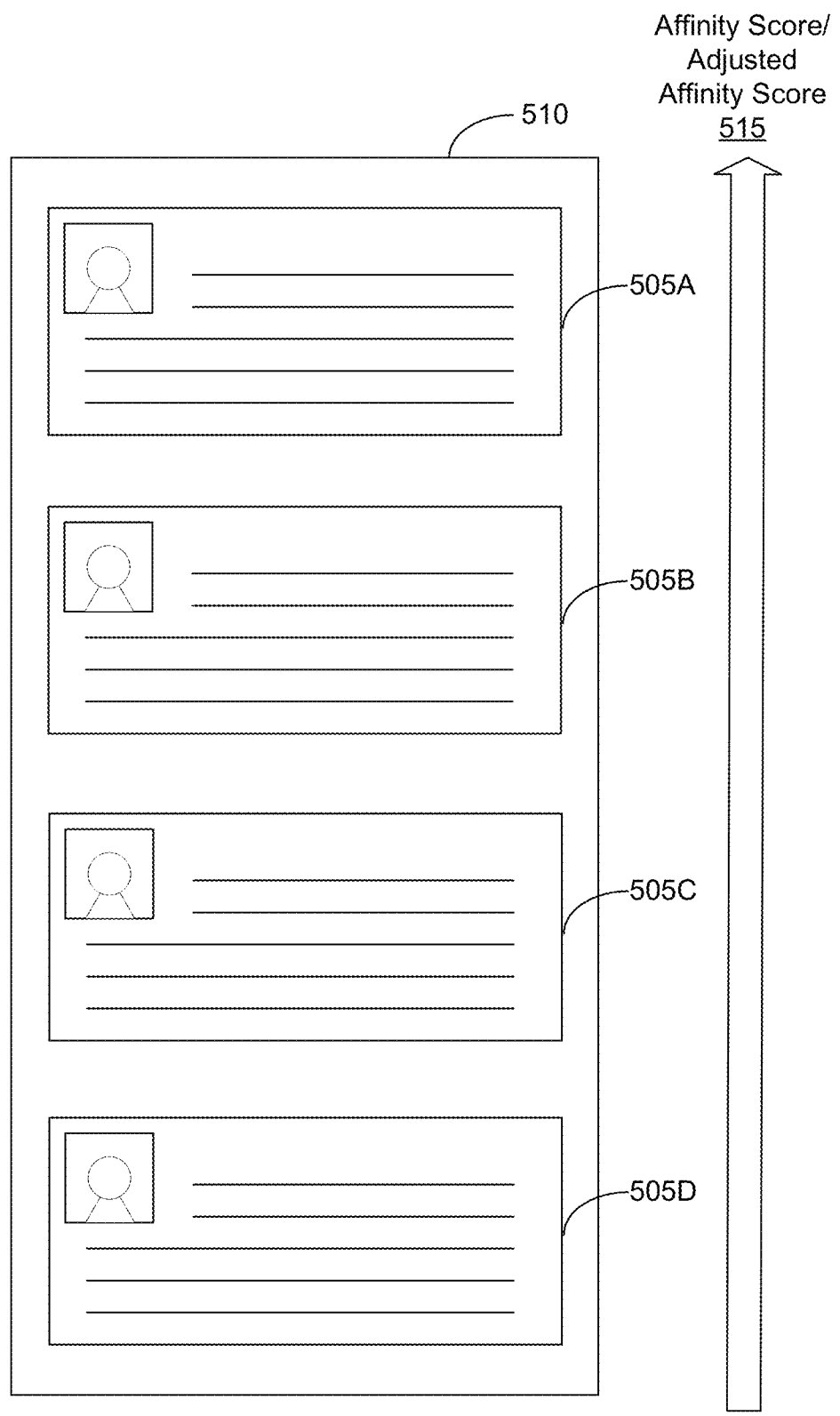
FIG. 5 is an example newsfeed including time-specific content selected for presentation to a viewing user of a social networking system, in accordance with an embodiment.

For example, as shown in the example of FIG. 5, content items 505A-D selected 350 for presentation to the viewing user are presented 355 in a newsfeed 510. The order in which the content items 505A-D are presented 355 is based on their rank, such that content items 505A-D with higher positions in the ranking (e.g., content items 505A-B) are associated with higher affinity scores/adjusted affinity scores 515 and are presented 355 in prominent positions in the feed 510. In contrast, content items 505A-D associated with lower positions in the ranking (e.g., content items 505C-D) are associated with lower affinity scores/adjusted affinity scores 515) and are presented 355 in less prominent positions in the feed 510.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    identifying an opportunity to present content to a viewing user of a social networking system;
    retrieving information stored in association with a profile of the viewing user, the information comprising one or more topics in which the viewing user has expressed an interest;
    computing an affinity score between the viewing user and each of a plurality of candidate content items eligible for presentation to the viewing user, the affinity score indicating a predicted affinity of the viewing user for the candidate content item and computed based at least in part on the information stored in association with the profile of the viewing user;
    determining a time range comprising a start time and an end time associated with a topic of the one or more topics in which the viewing user has expressed interest, the one or more of the start time and the end time indicating a time during which the topic is likely to be relevant to the viewing user;
    identifying a time-specific candidate content item of the plurality of candidate content items for which an affinity score was previously computed, the time-specific candidate content item associated with the topic of the one or more topics;
    comparing the time range associated with the topic with a current time to determine a relationship between the current time and a time range associated with the start time and the end time of the topic;
    adjusting the affinity score between the viewing user and the identified time-specific candidate content item based at least in part on the determined relationship between the current time and the time range associated with the topic, comprising decreasing the affinity score associated with the time-specific candidate content item responsive to determining the start time of the time range is after the current time;
    ranking the plurality of candidate content items based at least in part on the adjusted affinity score between the viewing user and the time-specific candidate content item; and
    selecting one or more of the plurality of candidate content items for presentation to the viewing user based at least in part on the ranking.

2. The method of claim 1, wherein comparing the time range associated with the topic with the current time comprises:
    determining whether the one or more of the start time and the end time of the time range associated with the topic is before or after the current time.

3. The method of claim 2, wherein adjusting the affinity score associated with the time-specific candidate content item based at least in part on the comparing comprises:
    increasing the affinity score associated with the time-specific candidate content item responsive to determining the end time is after the current time.

4. The method of claim 2, wherein adjusting the affinity score associated with the time-specific candidate content item based at least in part on the comparing comprises:
    increasing the affinity score associated with the time-specific candidate content item responsive to determining the start time is before the current time.

5. The method of claim 2, wherein adjusting the affinity score associated with the time-specific candidate content item based at least in part on the comparing comprises:
    decreasing the affinity score associated with the content item responsive to determining the end time is before the current time.

6. The method of claim 1, wherein adjusting the affinity score associated with the time-specific candidate content item based at least in part on the comparing comprises:
    determining a weight associated with the topic based at least in part on the comparing; and
    applying the weight associated with the topic to the affinity score associated with the time-specific candidate content item.

7. The method of claim 6, wherein the weight associated with the topic is inversely proportional to an amount of time elapsed between the end time and the current time.

8. The method of claim 1, wherein adjusting the affinity score associated with the time-specific candidate content item based at least in part on the comparing comprises:
    discounting the affinity score associated with the time-specific candidate content item based at least in part on the comparing.

9. The method of claim 1, wherein the one or more of the start time and the end time are determined based at least in part on information received from a user of the social networking system.

10. The method of claim 1, wherein determining the one or more of the start time and the end time associated with the topic of the one or more topics comprises:
    receiving information describing an occurrence of an event associated with the topic; and
    determining the one or more of the start time and the end time based at least in part on the information describing the occurrence of the event.

11. A computer program product comprising a non-transitory computer readable storage medium having instructions encoded thereon that, when executed by a processor, cause the processor to:
    identify an opportunity to present content to a viewing user of a social networking system;
    retrieve information stored in association with a profile of the viewing user, the information comprising one or more topics in which the viewing user has expressed an interest;
    compute an affinity score between the viewing user each of a plurality of candidate content items eligible for presentation to the viewing user, the affinity score indicating a predicted affinity of the viewing user for the candidate content item and computed based at least in part on the information stored in association with the profile of the viewing user;

determine a time range comprising a start time and an end time associated with a topic of the one or more topics in which the viewing user has expressed interest, the one or more of the start time and the end time indicating a time during which the topic is likely to be relevant to the viewing user;

identify a time-specific candidate content item of the plurality of candidate content items for which an affinity score was previously computed, the time-specific candidate content item associated with the topic of the one or more topics;

compare time range associated with the topic with a current time to determine a relationship between the current time and a time range associated with the start time and the end time of the topic;

adjust the affinity score between the viewing user and the identified time-specific candidate content item based at least in part on the determined relationship between the start time and the time range associated with the topic, comprising decreasing the affinity score associated with the time-specific candidate content item responsive to determining the start time of the time range is after the current time;

rank the plurality of candidate content items based at least in part on the adjusted affinity score between the viewing user and the time-specific candidate content item; and select one or more of the plurality of candidate content items for presentation to the viewing user based at least in part on the ranking.

12. The computer program product of claim 11, wherein compare the time range associated with the topic with the current time comprises:
determine whether the one or more of the start time and the end time associated with the topic is before or after the current time.

13. The computer program product of claim 12, wherein adjust the affinity score associated with the time-specific candidate content item based at least in part on the comparing comprises:
increase the affinity score associated with the time-specific candidate content item responsive to determining the end time is after the current time.

14. The computer program product of claim 12, wherein adjust the affinity score associated with the time-specific candidate content item based at least in part on the comparing comprises:
increase the affinity score associated with the time-specific candidate content item responsive to determining the start time is before the current time.

15. The computer program product of claim 12, wherein adjust the affinity score associated with the time-specific candidate content item based at least in part on the comparing comprises:
decrease the affinity score associated with the time-specific candidate content item responsive to determining the end time is before the current time.

16. The computer program product of claim 11, wherein adjust the affinity score associated with the time-specific candidate content item based at least in part on the comparing comprises:
determine a weight associated with the topic based at least in part on the comparing; and
apply the weight associated with the topic to the affinity score associated with the time-specific candidate content item.

17. The computer program product of claim 16, wherein the weight associated with the topic is inversely proportional to an amount of time elapsed between the end time and the current time.

18. The computer program product of claim 11, wherein adjust the affinity score associated with the time-specific candidate content item based at least in part on the comparing comprises:
discount the affinity score associated with the time-specific candidate content item based at least in part on the comparing.

19. The computer program product of claim 11, wherein the one or more of the start time and the end time are determined based at least in part on information received from a user of the social networking system.

20. The computer program product of claim 11, wherein determine the one or more of the start time and the end time associated with the topic of the one or more topics comprises:
receive information describing an occurrence of an event associated with the topic; and
determine the one or more of the start time and the end time based at least in part on the information describing the occurrence of the event.

21. A method comprising:
identifying an opportunity to present content to a viewing user of a social networking system;
retrieving information stored in association with a profile of the viewing user, the information comprising one or more topics in which the viewing user has expressed an interest;
determining time range associated with a topic of the one or more topics in which the viewing user has expressed interest, wherein the topic is more likely to be relevant to the viewing user during the time range associated with the topic than outside the time range;
identifying a time-specific candidate content item of a plurality of candidate content items eligible for presentation to the viewing user, the time-specific candidate content item associated with the topic of the one or more topics, and associated with a computed affinity score indicating a predicted affinity of the viewing user for the time-specific candidate content item;
comparing the time range associated with the topic with a current time to determine a relationship between the current time and the time range associated with the topic;
adjusting the affinity score between the viewing user and the identified time-specific candidate content item, based at least in part the determined relationship between the current time and the time range associated with the topic, comprising decreasing the affinity score responsive to determining that a start time of the time range is after the current time;
ranking the plurality of candidate content items based at least in part on the affinity score between the viewing user and the time-specific candidate content item; and
selecting one or more of the plurality of candidate content items for presentation to the viewing user based at least in part on the ranking.

22. The method of claim 21, wherein the topic is more likely to be relevant to the viewing user after the start time of the time range associated with the topic than before the start time.

23. The method of claim 21, further comprising:
sending the one or more of the plurality of candidate content items for presentation to the viewing user.

\* \* \* \* \*

UNITED STATES PATENT AND TRADEMARK OFFICE
CERTIFICATE OF CORRECTION

PATENT NO. : 10,664,532 B2
APPLICATION NO. : 15/436747
DATED : May 26, 2020
INVENTOR(S) : Singh et al.

It is certified that error appears in the above-identified patent and that said Letters Patent is hereby corrected as shown below:

On the Title Page

Item (51), Column 1, under "Int. Cl.", Line 3, delete "50/00 (2012.01)" and insert -- 50/01 (2013.01) --, therefor.

Signed and Sealed this
First Day of December, 2020

Andrei Iancu
*Director of the United States Patent and Trademark Office*